United States Patent Office 3,307,129
Patented Feb. 28, 1967

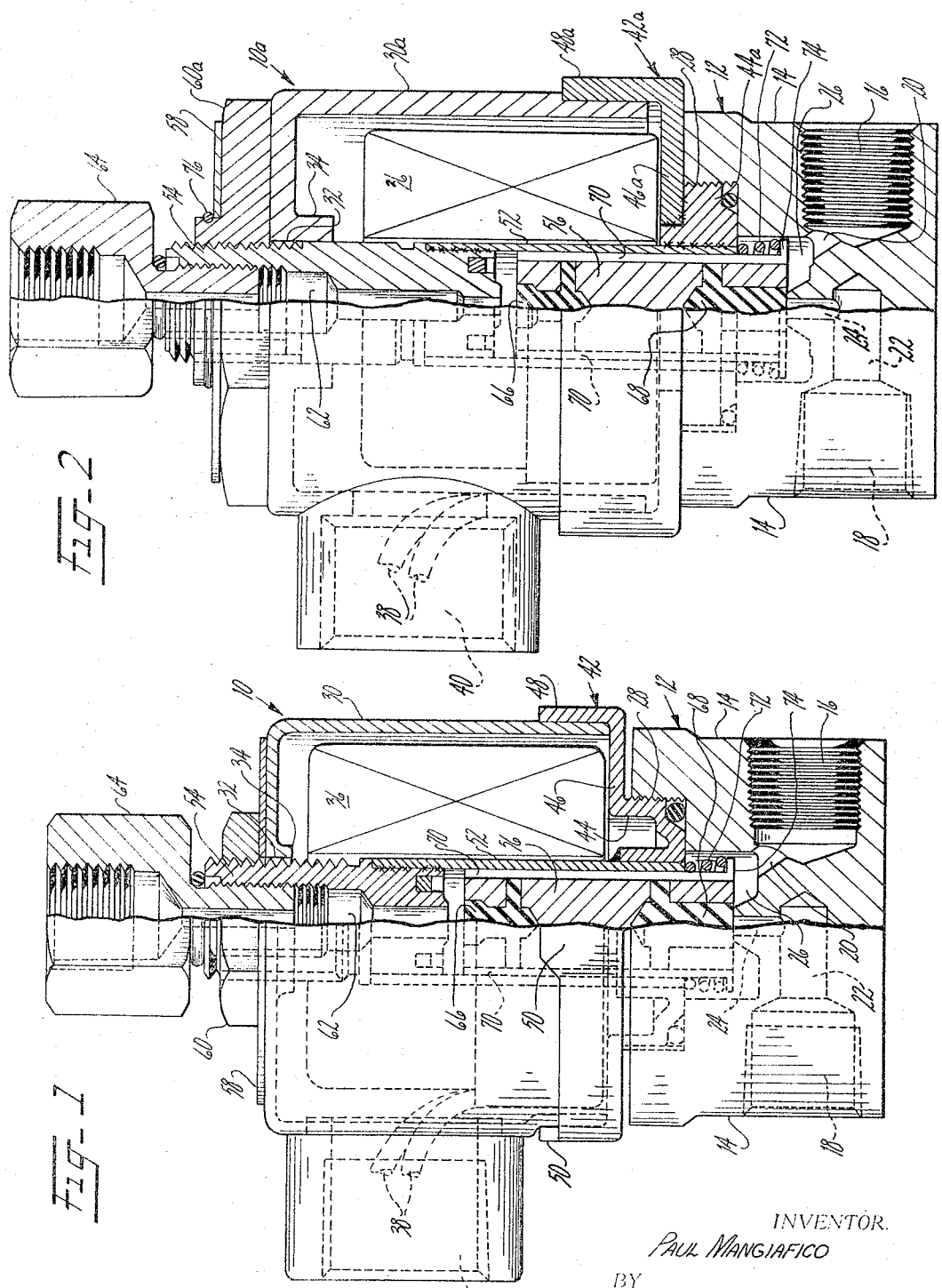

3,307,129
SOLENOID OPERATOR FOR A VALVE
OR THE LIKE
Paul Mangiafico, 142 Queen St.,
New Britain, Conn. 06053
Filed Mar. 23, 1964, Ser. No. 353,797
3 Claims. (Cl. 335—255)

This invention relates to a solenoid actuated valve and, more specifically, to an improved electrical actuator for such valve.

It is a general object of the invention to provide a more electrically efficient operator for solenoid actuated valves and to provide such operator as a unitary assembly of parts which can easily be connected as a unit to a body to complete the composite valve construction.

It is a more specific object of the invention to provide the aforesaid operator unit or sub-assembly in such form as to withstand explosion and the like without breakdown of its elements or disassembly thereof so that the operator sub-assembly can be connected to a standard valve body and provide a composite valve construction that will meet unusual standards of safety against fire or the like that might result from explosion.

The drawing shows the preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for the purpose.

Of the drawing:

FIG. 1 is an elevational view, partly in vertical cross-section, of a valve including a first form of improved operator provided in accordance with the present invention, this form being referred to hereinafter as the "standard"; and FIG. 2 is a view similar to FIG. 1 of a valve incorporating a second form of the improved operator, this form being referred to hereinafter as "the explosion proof" embodiment.

In the valve construction shown in FIG. 1, the "standard" operator is indicated generally by the reference numeral 10, and it will be observed that the operator is associated with a valve body 12. While the valve body 12 can be provided in many different forms, that shown is generally cylindrical, but it has two diametrically opposed external flats 14, 14 for the convenient application of pipe connections or other fluid conduit fittings in diametrically opposed threaded ports 16 and 18. The valve body also is provided with a plurality of passages 20, 22 and 24 which interconnect the ports 16 and 18. One of the passages, the passage 24, opens into a central recess 26 which is provided to open into the top surface of the body 12 and which is threaded at 28 adjacent said top surface. As will be more fully described, the threaded recess is provided for connection of the valve operator 10 to the valve body 12. When the said one passage 24 which opens into the recess 26 is closed at the recess, there can be no flow or communication in either direction between the ports 16 and 18 and there can be no flow or communication between the port 18 and any other port. However, when the passage 24 is open in the recess 26, there can be flow or communication between the ports 16 and 18 in either direction.

Referring now to the operator 10, it will be seen that this includes an inverted cup-shaped housing 30 having a central opening 32 in its top wall. The housing 30 is magnetic (made of magnetic material), and the central opening 32 is defined by an inturned flange 34 which is an integral part of the said housing. There is a distinct advantage in providing the flange 34 at the opening 32 in that this increased area surrounding the opening enlarges the flux path and thus reduces the flux density and leakage at the opening 32 in the operation of the device as will be described hereinafter.

The magnetic housing 30 is provided for an annular electric or magnetic coil 36 which is disposed within the housing with its central opening generally aligned with the central opening 32 in the top of the housing. Electrical connectors or conductors 38, 38 are provided for the coil 36, and these conductors project out of the housing through an opening 40 therein which is provided at the side of the housing. It will be observed that the opening 40 is threaded to receive an electrical fitting, but it will be understood that the opening can be of any desired shape and located anywhere that it is desirable to locate it on the housing 30.

The housing is seated upon a combination base and connector 42 which comprises a depending central portion 44 that is externally threaded for threaded engagement in the threaded portion 28 of the body recess 26. This is the connector portion of the member 42 which is magnetic, and the base portion comprises an integrally formed radial extension 46 that projects outwardly from the central portion 44 and which has an upturned peripheral portion 48. The open bottom end of the housing 30 rests upon the radially extending portion 46, and the bottom end portion of the housing is snugly embraced by the upturned peripheral portion 48. A series of wrench flats 50, 50 is provided around the upturned portion 48 for the application of a wrench to facilitate the connection and disconnection of the member 42 from the valve body 12. By so connecting and disconnecting the member 42, the entire operator 10 is connected and disconnected, since the operator comprises a unitary assembly of elements, the remainder of which will now be described.

The said remaining elements include a non-magnetic sleeve 52 which is fixedly secured in the central bore of the connector portion 44 of the combination housing base and connector. The said connector portion is inturned to define the said bore, and the sleeve 52 is welded or otherwise fixedly secured to the connector so as to project vertically upwardly therefrom into the central opening in the coil 36.

A plug 54 of magnetic material is welded or otherwise fixedly secured in the open upper end of the sleeve 52 to provide an upper limit of travel or stop for a plunger or armature 56 which is slidable in the sleeve. The plug 54 is externally threaded, and the threaded portion thereof projects upwardly through the central opening 32 in the top wall of the housing 30. An information or identification plate 58 surrounds the upwardly projecting portion of the plug 54 and a nut 60 is tightened on the threaded plug 54 to complete the unitary assembly or sub-assembly of the operator 10.

The valve shown in FIG. 1 is a "3-way" valve and, accordingly, the plug 54 is provided with a central bore 62 for the flow of fluid. The upper portion of the bore 62 is threaded to receive the reduced end of an adapter 64 that is utilized to connect the valve and particularly the flow passage 62 with a pipe or other fluid conduit.

The plunger 56 is freely slidable longitudinally in the sleeve 52, and it has a rubber valve seat 66 molded in its upper end and a generally similar seat 68 molded in its bottom end. The upper seat 66 is provided to close the reduced diameter bottom end of the fluid passage 62 when the plunger is elevated, and the seat 68 is provided to close the open top end of the passage 24 in the recess 26 when the plunger is in its lower position. When the plunger is in its lower position as shown, fluid can flow in either direction between the passage 20 (and thus the port 16) in the valve body 12 and the passage 62 in the plug 54. Such flow is permitted past the plunger 56 through a series of longitudinal channels 70, 70 provided in circumferentially spaced relationship on the periphery of the plunger. When the plunger 56 is elevated, it closes the bottom end of the passage 62 so that there can be no flow therethrough in either direction, and it opens the top end of the passage 24 to permit free communication in either direction between it and passage 20 and thus between the ports 16 and 18.

The plunger 56 is raised to its full upper limit in engagement with the plug 54 by energizing the the magnetic coil 36. When the coil 36 is de-energized, the plunger returns automatically to the bottom position closing the passage 24. This is caused by a frusto-conical coil spring 72 which surrounds the bottom end portion of the said plunger 56. The wide diameter end of the spring 72 is seated on an annular flange 74 provided at the bottom end of the plunger and the smaller diameter end of the coil spring is seated against the combination housing base and connector 42 below the non-magnetic sleeve 52. It is important to observe that the small diameter end of the coil spring 72 embraces the plunger 56. The purpose of this is to dampen undesirable lateral movement of the plunger 56 within the sleeve 52 and the "chatter" caused thereby when the coil 36 is energized by 60 cycle A.C. power.

It is to be understood that in the construction of a 2-way valve, the valve body 12 and the operator 10 can be provided precisely as shown except that the plug 54 is not provided with any internal fluid passage 62 and except that the reciprocable plunger or armature 56 is not provided with fluid conducting channels 70, 70. In the 2-way valve construction, whenever the coil 36 is energized to lift the plunger 56, flow is permitted in either direction between the ports 16 and 18, but when the coil is de-energized, no flow is permitted through the valve body 12.

The "explosion proof" valve shown in FIG. 2 is also a 3-way valve using many of the same parts used in the construction of the valve in FIG. 1, there parts being identified by the same reference numbers.

As will be observed, the explosion proof valve utilizes the same valve body 12 as does the standard valve, and there are only slight modifications in the operator 10a from the first described operator 10. These modifications comprise the provision of a magnetic housing 30a which is made of heavier gauge metal than was the housing 30, and the bottom part of the housing 30a is provided with a reduced diameter so that it can be embraced and supported by a modified combination housing base and connector 42a. The modified base and connector 42a is made of two parts comprising a solid central bushing 44a that is externally threaded and which is welded to the radially extending member 46a having the upturned flange 48a that embraces the bottom part of the housing 30a. Thus, the parts 44a and 46a can be disassembled as a unit 42a from the housing 30a.

Another difference occurs in the provision of a much heavier and wider nut 60a that is threaded to the projecting top portion of the plug 54. The nut 60a in the explosion proof valve covers a substantial portion of the top wall of the housing 30a, and the identification plate 58 is mounted on top of the nut 60a, being held in place there by a split ring 76.

Obviously, the alternative form of operator 10a which is provided for the explosion proof valve is designed to withstand the shock of internal explosion that may possibily occur in some installations. In providing the much heavier and sturdier construction for the operator 10a, and particularly in providing the combination base and connector 42a for the said operator, its use with a conventional valve body 12 is quite safe. Heretofore, explosion proof installations have required a special valve body having a much deeper threaded recess to prevent disconnection of the operator from the body in the event of explosion. In the present explosion proof form, it is felt that the operator 10a can be blown away from the valve body without undue risk of fire caused by the operator being blow apart and its elements scattered. The sturdy construction provided in the operator prevents its being blown apart in the explosions that may be encountered with such valve.

The invention claimed is:

1. A solenoid operator for a valve or the like comprising an inverted magnetic cup-shaped housing having a central opening in its top wall, an annular magnetic coil disposed in said housing, a combination housing base and connector having a central depending portion which is adapted for connection to the valve or the like and which has a vertical central bore, said base and connector also having a magnetic radially extending portion which is turned upwardly near its periphery to provide a seat for and to snugly embrace the bottom end portion of the housing, a non-magnetic sleeve fixedly secured in said bore and extending upwardly therefrom into the open center of the coil, a magnetic plug fixedly secured in the upper end of said sleeve and having an externally threaded upper end portion projecting outwardly through the said central opening in the top wall of the housing, a nut engaged with the threaded end of the plug and seated against the top wall of the housing to complete unitary assembly of the operator, a magnetic plunger freely slidable in said sleeve below the plug between an upper electrically energized position fixed by the plug and a lower position, said plunger being provided with a radially outwardly projecting flange on its bottom end, and a frusto-conical spring embracing said plunger with its larger diameter end seated on the plunger flange and with its smaller diameter end engaging the combination housing base and connector below the sleeve and embracing said plunger to dampen undesirable side-to-side movement thereof while permitting sliding movement in the sleeve.

2. A solenoid operated valve having an improved operator as set forth in claim 1 wherein the combination housing base and connector comprises two welded pieces, one being the central threaded portion and the other being the radially extending portion.

3. A solenoid operator for a valve or the like comprising an inverted magnetic cup-shaped housing having a central opening in its top wall, an annular magnetic coil disposed in said housing, a combination housing base and connector having a central depending portion which is externally threaded for connection to the valve or the like and which has a central bore, said base and connector also having a magnetic radially extending portion which is turned upwardly near its periphery to provide a seat for and to snugly embrace the bottom end portion of the housing and which is provided with a circumferentially spaced series of flats on its outer surface for the application of a wrench to facilitate connection and disconnection of the operator with the valve or the like, a non-magnetic sleeve fixedly secured in said bore and extending upwardly therefrom into the open center of the coil, a magnetic plug fixedly secured in the upper end of said sleeve and having an externally threaded upper end portion projecting outwardly through the central opening in the top wall of the housing, a nut engaged with the threaded end of the plug and seated against the top wall of the housing to complete unitary assembly of the operator, a magnetic plunger freely slidable in said sleeve below the plug between an upper electrically energized position fixed by the plug and a lower position, and spring means acting on said plunger to urge it to its lower position.

References Cited by the Examiner
UNITED STATES PATENTS

| | | | |
|---|---|---|---|
| 1,049,845 | 1/1913 | Geissinger | 251—129 X |
| 2,096,808 | 10/1937 | Jenkins et al. | 251—141 X |
| 3,013,768 | 12/1961 | La Mastra | 251—139 X |
| 3,082,359 | 3/1963 | Mangiafico et al. | 317—191 |
| 3,125,321 | 3/1964 | Van Domelen | 251—139 |
| 3,185,177 | 5/1965 | Brandenberg et al. | 251—139 X |

M. CARY NELSON, *Primary Examiner.*

R. C. MILLER, *Assistant Examiner.*